Jan. 28, 1941.  E. H. KOCHER  2,229,655
LUBRICATION
Filed Feb. 1, 1937   4 Sheets-Sheet 1

INVENTOR
Edward H. Kocher
BY
ATTORNEYS

Jan. 28, 1941.  E. H. KOCHER  2,229,655
LUBRICATION
Filed Feb. 1, 1937  4 Sheets-Sheet 2

INVENTOR
Edward H. Kocher
BY
ATTORNEYS

Jan. 28, 1941.  E. H. KOCHER  2,229,655
LUBRICATION
Filed Feb. 1, 1937  4 Sheets-Sheet 3
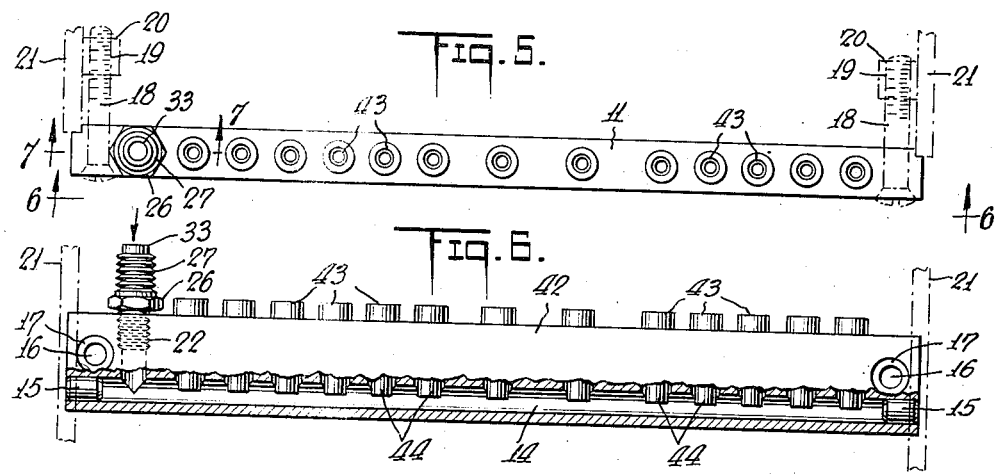
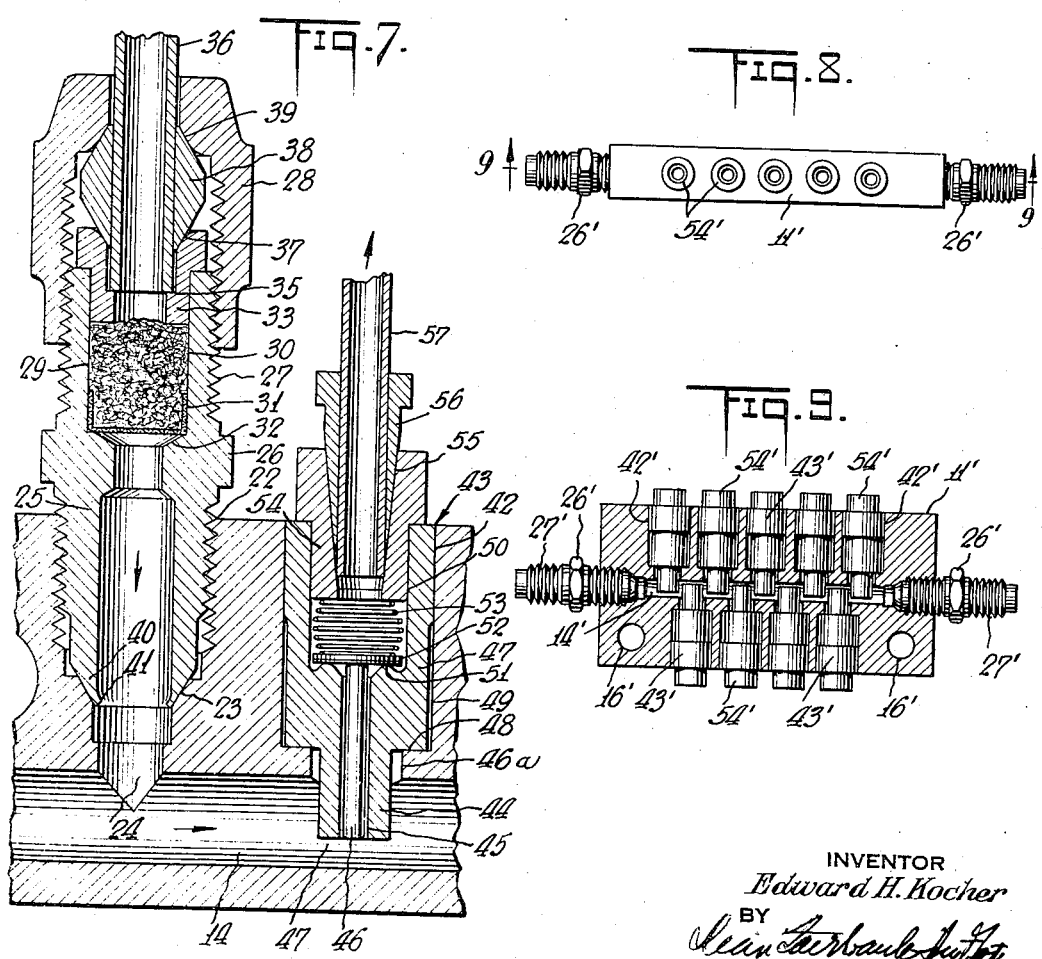
INVENTOR
Edward H. Kocher
BY
ATTORNEYS

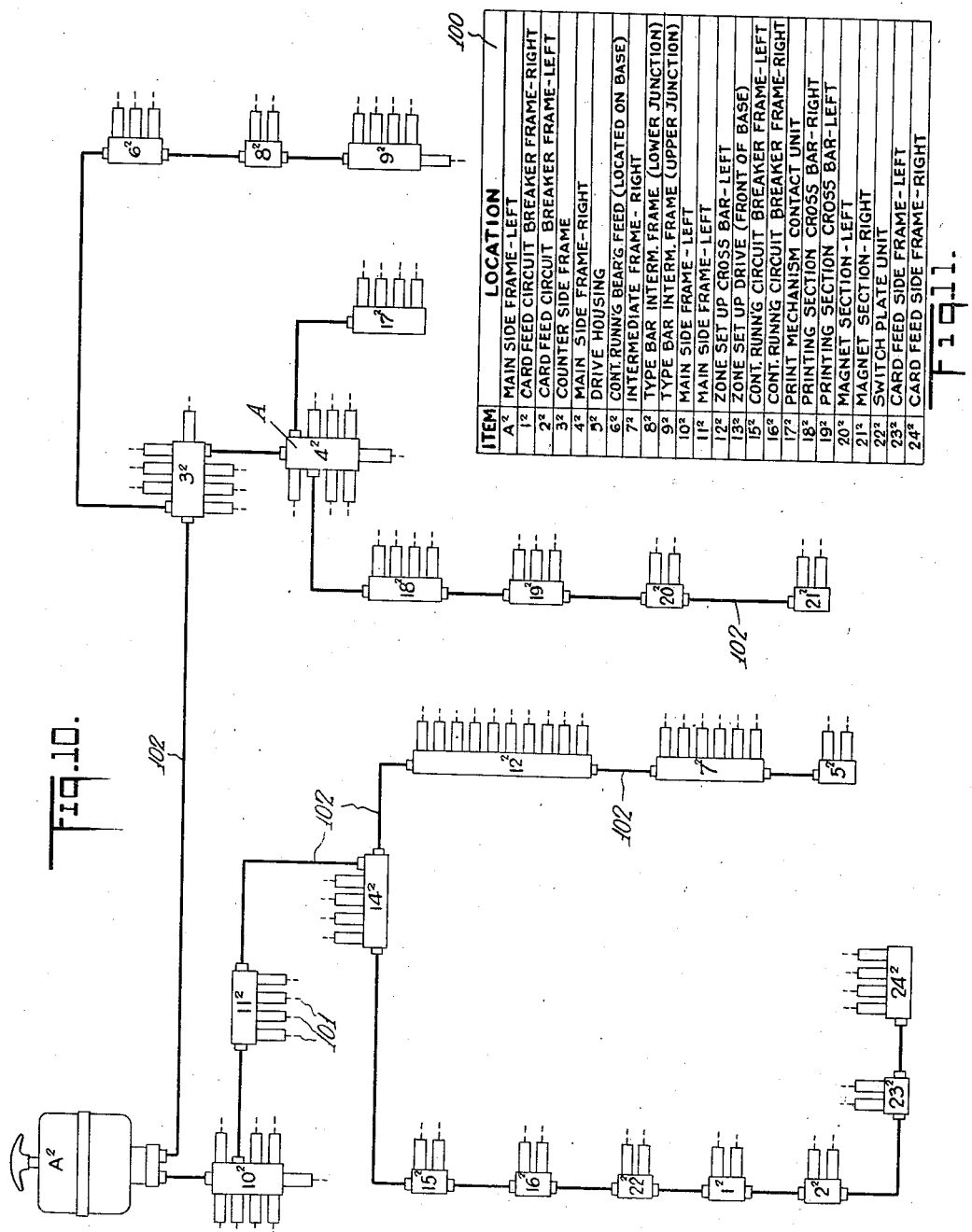

Patented Jan. 28, 1941

2,229,655

UNITED STATES PATENT OFFICE 2,229,655

LUBRICATION

Edward H. Kocher, Boonton, N. J., assignor to Auto Research Corporation, a corporation of Delaware Application February 1, 1937, Serial No. 123,384

12 Claims. (Cl. 184—7)

The present invention relates to a lubricating installation and it particularly relates to a lubricating installation adapted to industrial machinery and to machinery having closely grouped bearings.

In the usual type of industrial machinery, such as automatic accounting machines, automatic machine tools, and so forth, there are often a large number of bearings closely grouped together requiring accurately proportioned, yet relatively minute quantities of lubricant during operation.

In supplying such bearings with lubricant, it is desirable that each of the bearings or bearing elements be provided with proper proportions and quantities of lubricant, without underlubrication on one hand, and without overlubrication on the other, which latter would cause seepage over the exterior of the machine and render it unsightly and also cause it to collect dust and dirt.

In assuring such lubrication, however, it is necessary that the lubricating installation be compact and occupy relatively small volume adjacent the bearings without excessive piping or junctions, even though a large number of bearings may have to be supplied with lubricant, and it is among the objects of the present invention to provide such a compact and sightly lubricating installation which may be readily installed upon industrial machinery and which will assure satisfactory distribution of lubricant to a plurality of relatively closely spaced bearings without necessitating an excessive number of junctions or piping in and about the machine and without requiring substantial reconstruction of the machine.

Other objects are obvious or will appear during the course of the following specification.

In accomplishing these objects it has been found most satisfactory to provide a combined junction and flow metering unit which flow metering unit will be adapted to receive a sufficient number of proportioning devices as may be required to assure lubrication of the bearings.

In one form, the junction device receives a single inlet and a passage through which is provided with a sufficient number of outlet recesses each of which are designed to receive a flow resistance unit such as a drip plug or seepage device which device may be press fitted or screwed into the recesses or sockets in the junction unit.

Although many types of metering units may be employed such as measuring valve units, it has been found favorable for the purposes of the present invention to employ flow resistance units having a tremendously greater obstructing effect upon the flow of lubricant than either the piping or the bearings so that such devices, in themselves, will predominantly control the proportionment of the lubricant among the bearings, substantially regardless of the tightness of the bearings or of the varying length of the conduit system between bearings and the central source of lubricant supply and pressure.

These drip plugs may be of the type shown and described in Patents 1,632,772, 1,734,026, and 1,734,027.

In the preferred construction, the combined junction and metering devices are positioned between the source of lubricant and the bearings to be lubricated and are provided with a sufficient number of recesses receiving resistance units to lubricate the desired number of bearings. Each resistance unit may be connected with a tail pipe to the bearing to be lubricated and the lubricant may flow directly from the pipe into the bearing or be permitted to drip onto the bearings.

Although not specifically restricted thereto, the present invention will be described in its application to the lubrication of electrically controlled accounting machines.

In the drawings,

Fig. 5 is an end view of the junction units shown in Figs. 1 and 3, removed from the machine before the piping is assembled therewith;

Fig. 6 is a side view of the metering junction unit taken from line 6—6 of Fig. 5, but with part of the junction unit in fragmentary section;

Fig. 7 is a transverse sectional view upon an enlarged scale and upon the line 7—7 of Fig. 5 showing the inlet device and an outlet resistance device;

Fig. 8 is the top view of an alternative metering junction removed from the machine before the piping is assembled therewith.

Fig. 9 is a transverse sectional view of the unit taken on line 9—9 of Fig. 8.

Fig. 10 is a diagrammatic plan of the application of the lubricating installation of the present application to an alphabetic accounting machine.

Fig. 11 is a chart itemizing the bearings which are fed by the elements shown in Fig. 10.

Figures 1, 2:
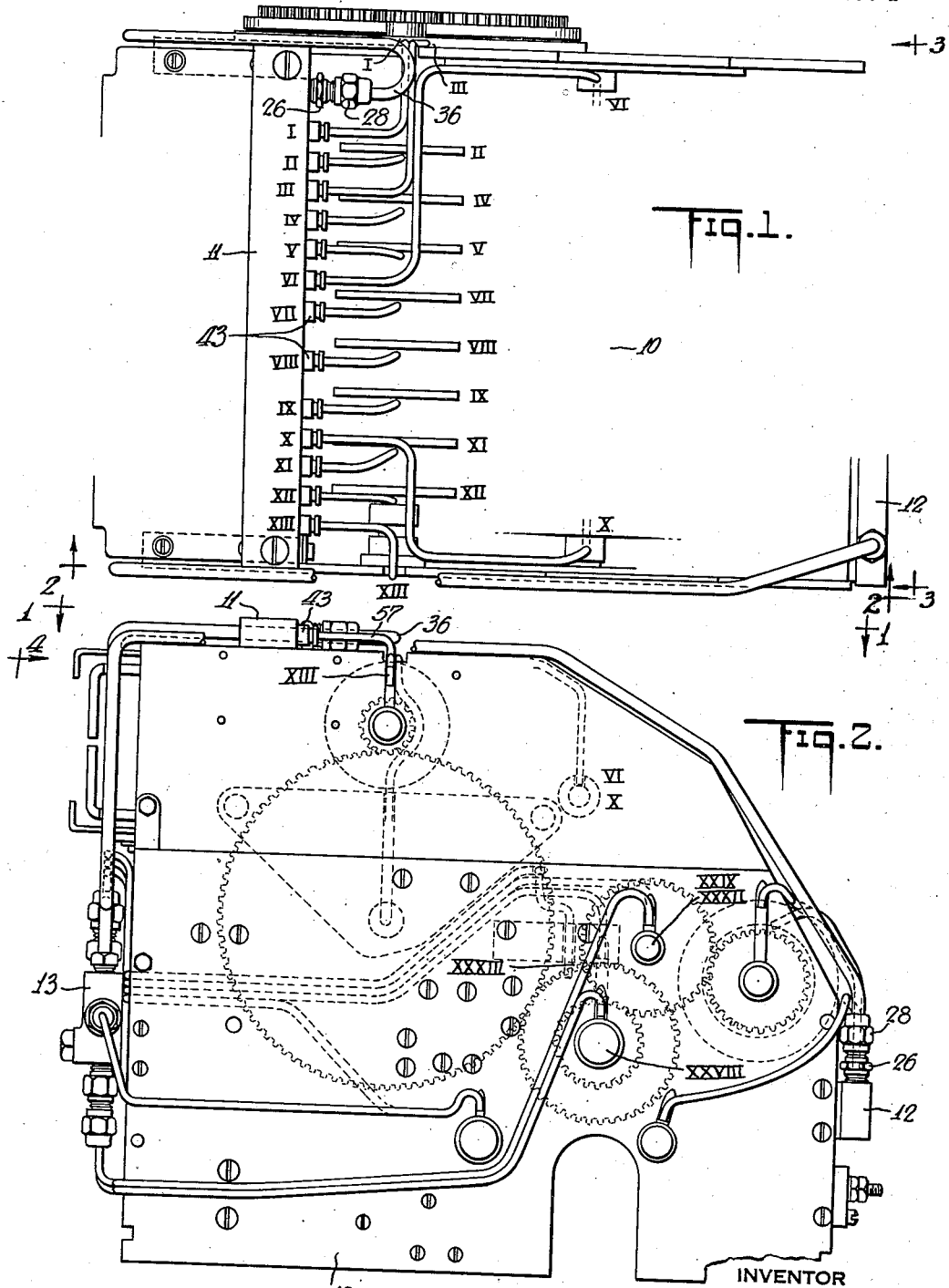
Fig. 1 is a top view of a junction unit with accompanying inlet and outlet piping, showing the metering junction unit attached to a counter machine, Fig. 1 being taken upon the line 1—1 of Fig. 2.
Fig. 2 is another view of the machine of Fig. 1 showing the end of the junction of Fig. 1 and also indicating the attachment of other metering junctions and piping on the machine, Fig. 2 being taken upon the line 2—2 of Fig. 1.
Figure 3:
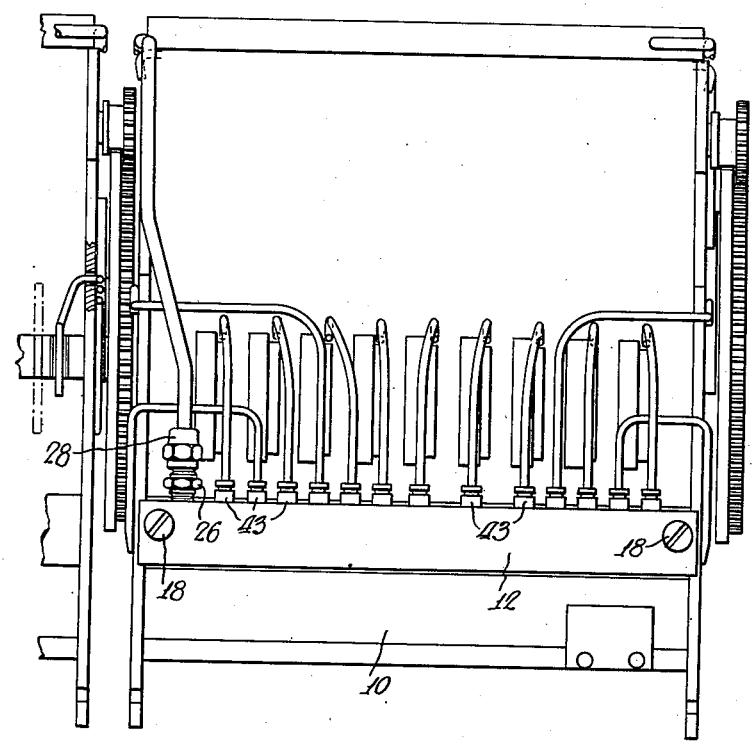
Fig. 3 is a side view of the machine of Figs. 1 and 2 upon the line 3—3 of Fig. 1.

Referring to Figs. 1 to 3, the machine frame 10 encloses a counter assembly.

The frame 10, as shown in Figs. 1 to 4, carries a plurality of junctions 11, 12, and 13, the junctions 11 and 12 being shown in greater detail in Figs. 5 to 7.

Referring to Figs. 5 to 7, the junction 11 consists of a bar of metal, the lower portion of which is provided with a longitudinal bore 14 (see Fig. 6) extending entirely through the ends, which bore is plugged as indicated at 15. The ends of the bar are provided with the bores 16, countersunk as indicated at 17 through which bores extend the bolts 18, shown in Fig. 5, these bolts extending through the tapped openings 19 in the ears 20 extending inwardly from the frame elements 21 of the machine.

The upper portion of the bar 11 is provided with a tapped socket 22 (see particularly Fig. 7). The socket 22 is provided with a beveled seat 23 at its bottom, and communicates through the smaller bore 24 with the main longitudinal bore 14.

The tapped socket 22 is designed to receive the threaded end portion 25 of the connection 26 the other end of which is threaded, as indicated at 27, to receive the coupling nut 28. The socket 29 in the inlet end of the body 26 receives a felt 30 which is backed by a screen 31, said screen resting against the beveled portion 32 of the socket 29.

The outer portion of the felt 30 is annularly held in position by the hard metal sleeve 33 which has a shoulder 35 to receive the tubing end 36 and which is provided with a beveled portion 37 to receive the inner end of the double tapered coupling sleeve 38. The outer end of the double tapered coupling sleeve 38 contacts with the beveled portion 39 on the interior of the coupling nut 28, and when the nut 28 is firmly screwed down, the inner and outer edges of the sleeve 38 are crimped or deformed about the pipe 36, thus forming a liquid tight connection.

The lower end of the body 26 is provided with a tapered end 40 which is deformed, as indicated at 41, at the bevel 23 to make the connection lubricant tight with said junction 11.

The upper portion of the bar 11 is also provided with the sockets 42 into which are press fitted the bodies 43 of the flow metering or proportioning outlet fittings. As shown, each of these fittings are provided with a nipple 44 carrying the bore 45 which receives the pin 46, the bore 45 and the pin 46 having accurately predetermined dimensions so as to leave a very narrow annular crevice having a width of a few thousandths of an inch. The length of the crevice is such as to set up a restricting effect tremendously greater than that encountered in the piping or in the bearings so that the restriction device will predominantly control the flow of lubricant from the central pump to the bearings.

The nipple 44 is inserted through the bore 46a and extends into the passageway 14 and the pin, if it is loose, may fall so that its lower end contacts the bottom of the passageway. The spacing 47 is such, however, as not to permit any material change in the restricting effect of the restriction device.

The enlarged portion 47 of the body 43 is shouldered at 48 to contact with the bottom of the socket 42 and it is recessed, as indicated at 49, to enable it to be press fitted more readily into the socket 42. The body 43 is also provided with the enlarged socket 50, the bottom of which is formed as a valve seat 51, said valve seat contacting with the valve element 52. The valve element 52 is provided with a coil spring 53 which reacts against the annular member 54 which is press fitted into the outer portion of the socket 50.

The annular member 54 is provided with a tapered socket 55 for receiving the tapered coupling sleeve 56 which is crimped about the pipe and tubing end 57 inserted therein.

The coupling connections, as shown, to connect the tubing 36 to the body 26 and the tubing 57 to the body 43, may take other forms such as shown in the copending applications, Ser. No. 727,719, filed May 26, 1934, now Patent No. 2,182,811, dated December 12, 1939, and Ser. No. 727,720, filed May 26, 1934, now Patent No. 2,134,719, dated November 1, 1938, and also in Patent No. 2,029,325 dated February 4, 1936.

The flow metering fittings, as indicated at 43, may also take other forms as shown in Patents No. 1,732,212, 1,734,026 and 1,734,027, or in some instances, it may take the form of measuring valves such as shown in Patents No. 2,017,848, dated October 22, 1935, and 2,003,281, dated June 4, 1935.

In the embodiment of Figs. 5 to 7, the lubricant does not pass beyond the junction 11 but solely flows to the various flow metering outlets 43 and through the connected tubing 57.

In the junction of Fig. 8, similar functioning parts being indicated by the same numerals as is Figs. 5 to 7 but primed, the lubricant may flow directly through the junction from inlet fitting to outlet fitting 26' through the longitudinal bored passageway 14'. The body 11' of the junction receives the longitudinal bore 14' in its middle portion instead of in its lower portion, as indicated in Figs. 5 and 6 and the sockets 42' for reception of the drip plug bodies 43' are bored from both sides of the body 11' toward the passageway 14' as shown.

Figure 4:
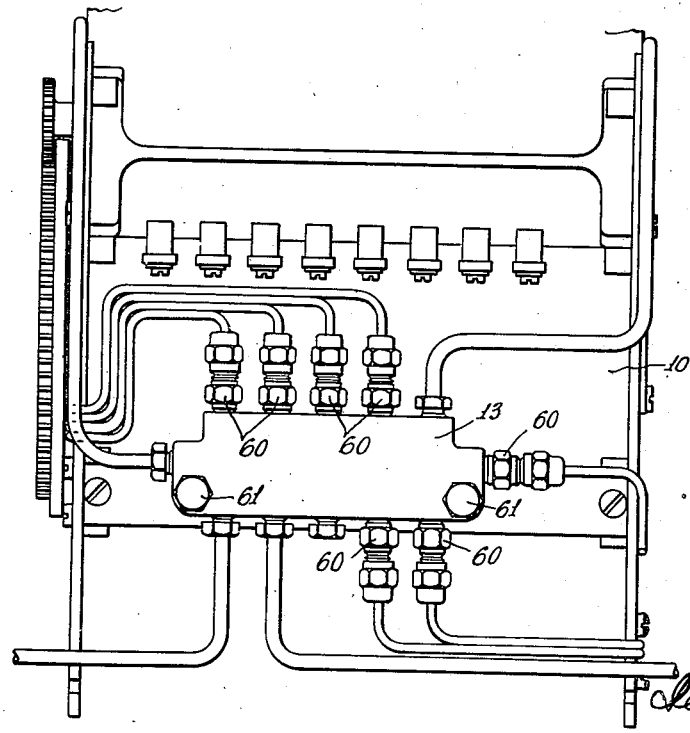
Fig. 4 is a side view of the machine of Figs. 1 to 3 upon the line 4—4 of Fig. 2.

Instead of having the drip plug bodies press fitted into position in the junction, as shown best in Fig. 4, the drip plug 60 may be of the type shown in Patent No. 1,632,772, and they may be screwed into tapped sockets in the junction body 13, the bolts 61 attaching the junction to the machine frame 10.

The coupling connection to the ends of the drip plug 60 is of the same type as shown at the left of Fig. 7.

The various outlets of the junctions 11, 12 and 13, as shown in Figs. 1 to 4, are connected by tubing to the bearings to be lubricated in the manner indicated in Fig. 10.

To correlate the various metering outlets 43 and 60 to the bearings which they feed, these metering units are designated with Roman numerals I to XXXIII, and the bearings which are lubricated through the tail pipes from these outlets are designated by the same numerals.

It is apparent that, as shown in Figs. 1 to 4, the combined junction metering units 11, 12 and 13 of Figs. 5 to 7, and 11' of Figs. 8 and 9, are capable of wide utilization and may be adapted to other machinery than accounting machinery where bearings are closely grouped together and where a large number of bearings are to be fed in a relatively small area.

The system may be fed from the center source, which may be a manually actuated pump, as shown in Patent No. 1,862,482 or an automatically actuated pump as shown in applications Ser. Nos. 635,526, filed September 30, 1932, now Patent No. 2,145,245, dated January 31, 1939, or 745,187, filed September 24, 1934.

In Fig. 10 is shown a diagrammatic layout of a metering distribution system which may be applied to an alphabetical accounting machine, the pump $A^2$ being mounted on the main side frame of the machine and said pump feeding a plurality of junctions $1^2$ to $21^2$, all inclusive, each of which junctions may be of the form shown at 11, 12 and 13 or 11′ in Figs. 1 to 9. Each of the junctions $1^2$ to $24^2$ shown in Fig. 10 are provided with a plurality of outlets to the bearings or bearing assemblies, as designated in the chart 100 (Fig. 11).

In Fig. 10 the tail pipes are indicated at the dotted lines 101 while the main pressure lines are indicated by the solid piping 102.

The present invention is particularly designed to enable application of a high restriction or obstruction metering or proportioning distributing system to a mechanism having a plurality of closely spaced and/or widely distributed groups of bearings. The piping system should preferably be substantially filled with lubricant and the volume of the discharge of the pump should be such as to quickly take up any residual resiliency in the system and to apply full pump pressure to the metering outlets. The metering outlets should produce an obstructing or restricting effect tremendously higher than the maximum obstructing effect of the piping or bearings, the obstructing or restricting effect of the outlets preferably exceeding that of the piping or bearings, by 10 to 100 times, and preferably at least 50 times.

It is desirable that the central pump A, which may be of the construction disclosed in Patent No. 1,862,482, or in application Ser. No. 635,526, filed September 30, 1932, now Patent No. 2,145,245, dated January 31, 1939, should maintain a substantially constant pressure upon the flow metering outlets of the types shown in Fig. 7 until the discharge to the bearings has been substantially completed. Preferably the total discharge of the pump should be from 5 to 500 drops, while the discharge to each bearing should be from ½ to 4 drops and the pressure exerted upon the system by the pump should be from 30 to 100 pounds per sq. inch. The preferred oil to be utilized is light machine oil.

In one embodiment of the invention which has been employed the junctions of the type 11 as shown in Figs. 5 and 6 might contain any number of flow metering devices or drip plug outlets varying from 2 up to 100 or more and each of these drip plug outlets generally may contain an orifice having a central bore of .052 inch in diameter and a pin of .050 to .046 inch in diameter leaving a crevice of .001 to .003 inch radially the length of the crevice preferably being from ¼ to ½ inch.

It will thus be seen that there is herein described a device in which the several features of this invention are embodied, and which device in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a lubricant distributing system, piping including elongated rectangular junctions each having a longitudinal interior bore and transverse outlet recesses parallel to each other and high obstruction metering elements blocking said recesses and carrying tail pipe outlet connections, said elements each consisting of a collar having a small diameter nipple projecting into said bore, said nipple having a central bore receiving a restricting element, and a large diameter portion having a socket receiving a coupling to an outlet connection.

2. In a lubricant distributing system, piping including elongated rectangular junctions each having a longitudinal interior bore and transverse outlet recesses parallel to each other and high obstruction metering elements blocking said recesses and carrying tail pipe outlet connections, said recesses being shouldered adjacent said bore and said elements consisting of tubular members having obstructing elements therein, said tubular elements being press-fitted into said recesses and abutting said shoulders and having nipples projecting into said bore.

3. In a lubricant distributing system, piping including elongated rectangular junctions each having a longitudinal interior bore and transverse outlet recesses parallel to each other and high obstruction metering elements blocking said recesses and carrying tail pipe outlet connections, said elements taking the form of cylindrical fittings having central bores receiving pin restrictions and having outlet sockets receiving couplings to said outlet connections, said fittings being press fitted into said recesses, said fittings having nipple extensions projecting into said longitudinal bore.

4. In a lubricant distributing system, piping including elongated rectangular junctions each having a longitudinal interior bore and transverse outlet recesses parallel to each other and high obstruction metering elements blocking said recesses and carrying tail pipe outlet connections, said recesses being cylindrical and shouldered and said elements taking the form of cylindrical fittings with nipple extensions and being of decreased diameter adjacent said nipples and said elements being press fitted against said shoulders with said nipples extending beyond said shoulders, said fittings being provided with central bores receiving restriction pins, said bores extending through said nipples.

5. In a lubricating installation having trunk piping and outlet tail piping, a junction comprising a metal bar having a longitudinal interior bore and a plurality of parallel recesses, said recesses being provided with inlet and outlet fittings having flow obstructing means, each of said outlet fittings including an elongated cylindrical body with a central bore and a nipple projecting from one end and a recess in the other end, said central bore also extending through said nipple, a valve in the bottom of said last recess having a coil seating spring and a centrally bored shouldered plug inserted in the outer portion of said recess, serving as a reaction member for said spring, said bore in said plug being tapered and receiving a tubing end and a deformable coupling sleeve.

6. A lubricant dividing fitting comprising a flat elongated rectangular metal body having fluid passages arranged in parallelism therein and a plurality of pressed-in pipe connectors accessible from the exterior of the fitting and coaxial with the respective fluid passages, and adapted to provide fluid tight connection with supply and distributing tubes, a longitudinal bore extending through said body and connecting said fluid passages, said body having fastening holes extending transversely into the interior of the body at right angles to said passages, said passages being provided with flow metering plugs carrying said connectors, said plugs having extension inlet nipples projecting into said longitudinal bore.

7. A lubricant fitting comprising a body and including a flat unitary elongated rectangular body devoid of mounting lugs therefor, having a longitudinally extending fluid bore, a tapped cavity communicating with the end of the bore, said cavity having a conically shelved bottom to provide fluid tight connection with a supply tube, said body having a clamping seat at one side thereof and a bolt opening extending transversely through said seat and through said body and being free from communication with said fluid bores and cavity, said body being provided with outlet sockets and flow metering devices, having central pin restricted bores, press-fitted into said sockets, said fluid bore feeding said sockets.

8. A unitary dividing or junction fitting comprising a metal bar including a longitudinal bore extending substantially the full length thereof and a plurality of sockets extending transversely to and communicating with said bore and receiving pressed-in flow controlling fittings, and a plurality of nipples for pipe terminals extending outwardly from the sockets and connected to said fittings, each of said sockets being provided with a shoulder adjacent the bottom thereof and each of said fittings being provided with reduced diameter portion which abuts said shoulder and projects into said bore.

9. In a junction consisting of an elongated bar or block of metal, having a bore extending longitudinally therethrough and a cylindrical recess opening into said bore and transverse to said bore, said recess being shouldered and of reduced diameter adjacent the bottom thereof and adjacent said longitudinal bore; the combination therewith of a high restriction flow metering fitting consisting of a cylindrical body having a large diameter outlet end and also having an inlet nipple of smaller diameter extending from said large diameter end, a socket centrally located in the large diameter end of the body and a relatively small bore extending centrally through the nipple, a restriction pin extending through and substantially filling said bore and a valve positioned in the inner end of said socket, a sleeve element press-fitted into the outer end of said socket having a tapered bore, a tapered coupling sleeve forced into said tapered bore, and a tubing connection inserted into said tapered coupling sleeve and pressed by said tapered coupling sleeve to form a tight connection to said body, said large diameter end being press-fitted into said recess and abutting said shoulder in said recess, said nipple projecting past said shoulder through the bottom of said recess into said bore.

10. A high restriction flow metering fitting consisting of a smooth unthreaded cylindrical body having an inlet nipple of smaller diameter extending from one end thereof, a socket in the other end of the body and a relatively small bore extending through the nipple, a restriction pin extending through said bore and a valve positioned in the inner end of said socket, a sleeve element press-fitted into the end of said socket having a tapered bore, and a tapered coupling sleeve fitted into said tapered bore.

11. A high restriction flow metering fitting consisting of an unthreaded elongated body having a nipple of smaller diameter extending from one end thereof, a socket in the other end of the body and a relatively small bore axially extending through the body and the nipple, a restriction element in said bore and a valve positioned in said socket, a shouldered sleeve element fitted into the end of said socket, the shoulder of which abuts the other end of the body, and a tapered coupling sleeve fitted into said sleeve element.

12. In a lubricating installation for a small compact mechanism having a body with side walls and a plurality of closely spaced bearings requiring small, yet accurately proportioned quantities of lubricant during operation of the mechanism, an elongated junction element mounted on one of the side walls and extending laterally of said side wall, said junction element including an elongated flat metal block, said block having a longitudinal bore extending substantially the entire length thereof, bolt receiving bores at the ends of the block transversely extending through the ends of the block without communication with said longitudinal bore to receive bolts to attach said block to said wall, a plurality of bores transverse to said longitudinal bore and bolt receiving bores and communicating with said longitudinal bore, a plurality of high restriction flow metering fittings in said last-mentioned plurality of bores, a plurality of tail pipes extending from said metering fittings to said bearings and means to feed lubricant under pressure to said longitudinal bore, said transverse bores being provided with shoulders adjacent the bottom thereof and said fittings being unthreaded and being shouldered to abut said shoulders in said transverse bores and being provided with nipple portions extending into said longitudinal bore.

EDWARD H. KOCHER.